Figure 1:
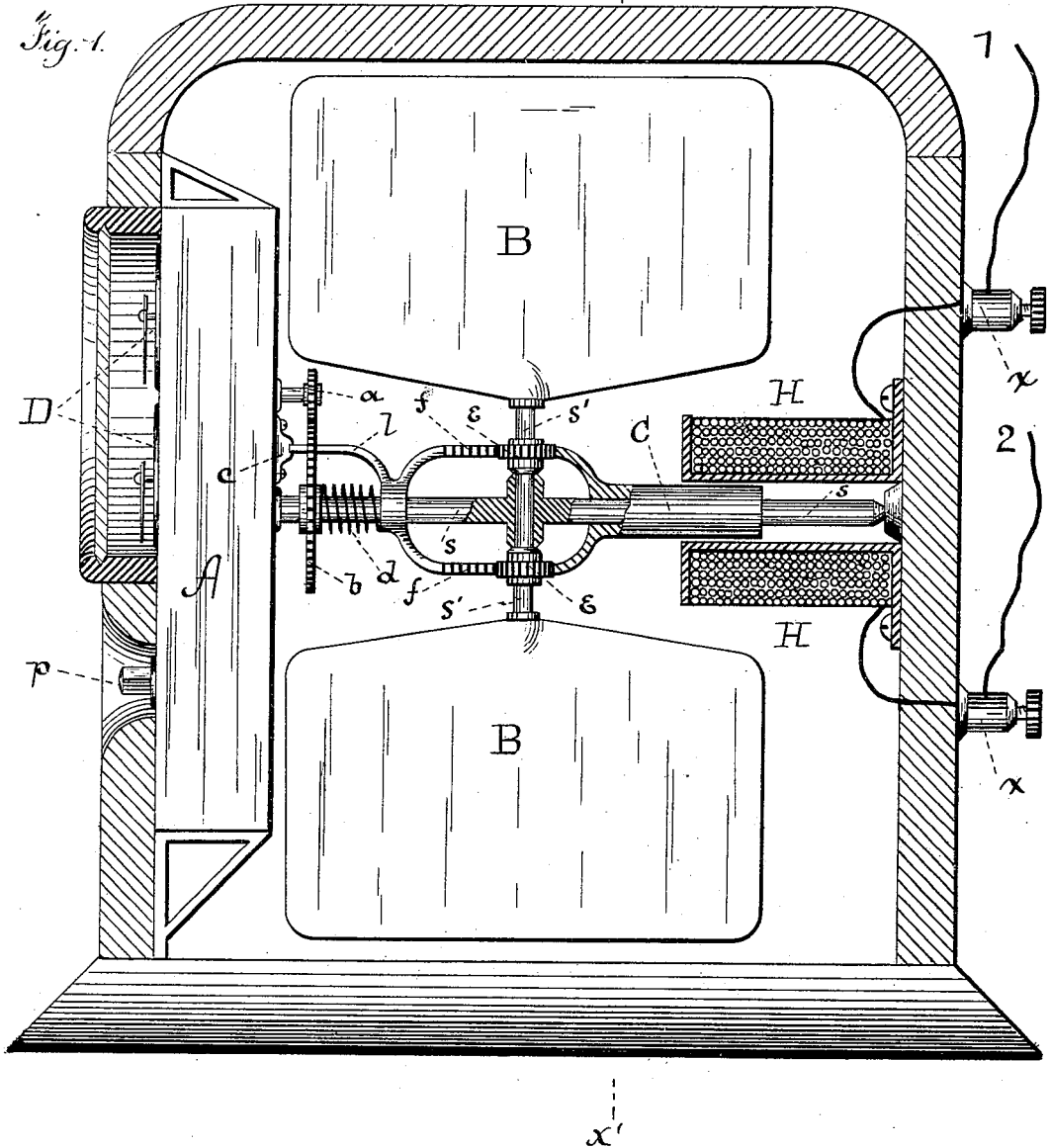

(No Model.) 3 Sheets—Sheet 1.

S. D. MOTT.
MEANS FOR MEASURING ELECTRIC CURRENTS.

No. 267,445. Patented Nov. 14, 1882.

WITNESSES:

INVENTOR:
S. D. Mott

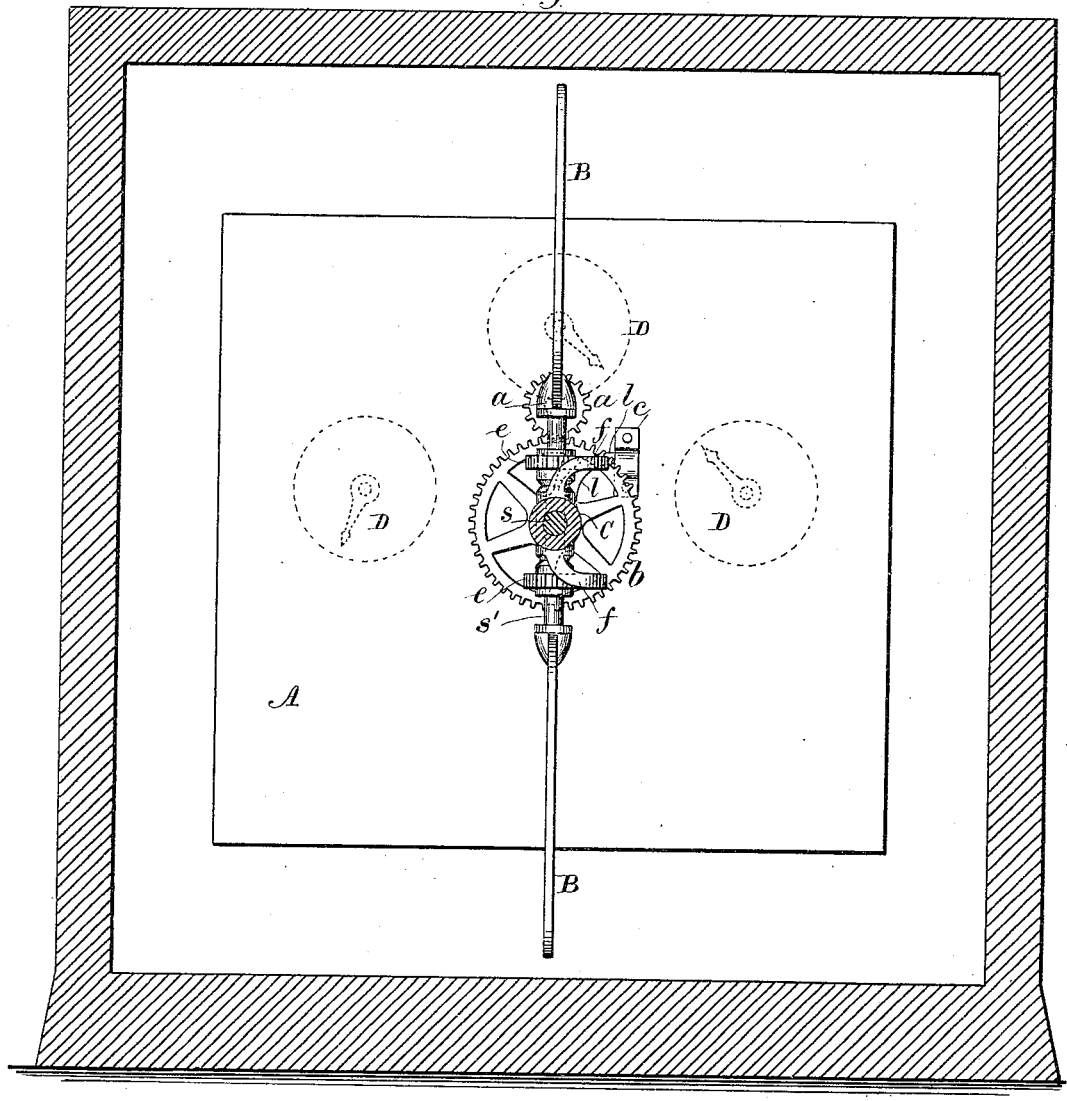

(No Model.) 3 Sheets—Sheet 3.
S. D. MOTT.
MEANS FOR MEASURING ELECTRIC CURRENTS.
No. 267,445. Patented Nov. 14, 1882.
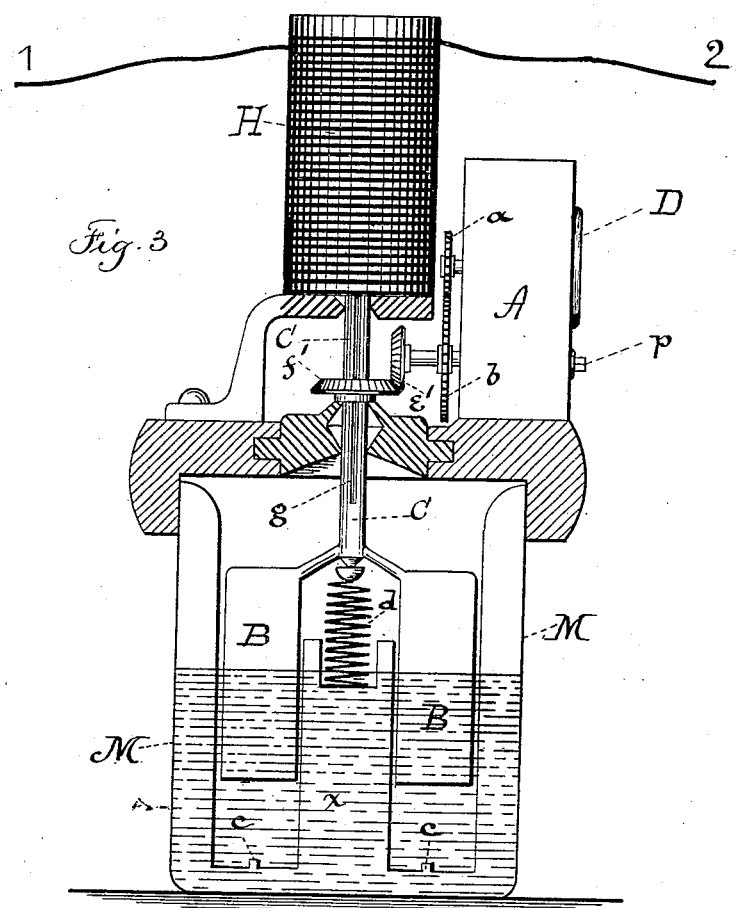
WITNESSES:
INVENTOR:

UNITED STATES PATENT OFFICE.

SAMUEL D. MOTT, OF NEW YORK, N. Y.

MEANS FOR MEASURING ELECTRIC CURRENTS.

SPECIFICATION forming part of Letters Patent No. 267,445, dated November 14, 1882.

Application filed April 24, 1882. (No model.)

*To all whom it may concern:*

Be it known that I, SAMUEL D. MOTT, of the city and State of New York, have invented an Improvement in Means for Measuring Electric Currents, of which the following is a specification.

The object I have in view is to make an accurate and practical mechanical meter, as distinguished from one depending on a magnetic motor or an electrolytic action for measuring an electric current, the same being durable in use, economical in construction, and requiring no special skill or apparatus to determine the quantity of electricity measured by it. This I do by employing the varying current to adjust a portion of the mechanism that regulates the speed of a train of gears actuated by a constant power—such as a weight or spring—which train operates a suitable register which denotes the number of units of current consumed, or the number of lamps in circuit. I have adapted my meters more especially for the incandescent systems of lighting and place them in direct multiple-arc or shunt circuits. A mechanism has been used where a variable gear was placed between a clock-work having a constant speed and a registering-dial, the intermediate gear being adjusted by magnets. In this there are mechanical difficulties which interfere with the accuracy of registration. I vary the speed of the clock-work in proportion to the current employed, by the use of resistance to the movement of that clock-work, said resistance being great with a small current and lessening as the current increases, so as to effect a proportionate registration. An eight-day-clock spring will, if used five hours per day average, run one month without requiring to be rewound. I therefore prefer for my constant power the ordinary clock-spring, in combination, if desired, with a fusee or similar device to compensate for the loss of force as the spring unwinds itself. A weight may be used in place of the spring and the power may be wound by automatic mechanism, if desired.

In the drawings, Figure 1 shows my meter with the case and part of the shaft in section. Fig. 2 is a section at the line $x'$ $x'$, showing the fan and the rear view of the case containing the clock-work. Fig. 3 shows the meter with the fans revolving in a liquid.

The speed of the clock-work is controlled by a pair or several pairs of fans, B. The angles of the fans to the axis of rotation is changed as the current varies in strength, so as to produce a resistance to the mechanical rotation that is in the reverse proportionate to the electric energy.

The speed-power is in the case A. It operates by the pinion $a$ and wheel $b$ to revolve the shaft $s$. On this shaft is a cross-head that carries the shaft $s'$ of the fans B. The current passes by the wires 1 2 and binding-posts $x$ to the helix H, in which it acts upon the solenoid-core C to give the same an end motion upon the shaft $s$ in proportion to the strength of the current.

The bows $f$, having rack-teeth, are moved endwise with the core C and act upon the pinions $e$, and turn them and the fans B to more or less of an inclination. The greater the current the greater the inclination of the fans and the less their resistance in the air or other fluid within the surrounding case, and the less the current the greater the resistance of the fans. The contractile spring $d$ acts in the opposite direction to the solenoid-magnet, and the spring-power can run faster and make a higher register upon the dials D when there is a strong current than when there is a weak one, because the resistance of the fan is in the reverse proportion to the strength of current. Hence the registration will be in proportion to the current, and when there is no current the stop $l$ comes into contact with the block $c$ on the case A and prevents the clock-work moving.

The train of gearing between the shaft of $a$ and the hands or dials D may be of any desired character, and the divisions on the dial are adapted to indicate the electric energy passing over the circuit.

The manner of indicating the electric energy consumed may vary, but should be based upon established data, so as to denote units, &c.

In consequence of the racks $f$ being at the same sides of the respective pinions E, the fans are turned together by the shaft $s'$, and, although the fans stand in the same plane, there will not be any unnecessary friction of the shaft $s$ in its bearings, because there is no tendency to move the shaft endwise, as one fan in revolving has the direction of a right-handed screw-propeller, and the other that of a left-handed screw-propeller.

The case in which the fans B revolve is made for preventing injury to the parts of the meter, and for excluding external currents of air. If desired, such case may be made tight, and contain a fluid or liquid—such as oil, glycerine, alcohol, or petroleum. In this case the shaft should stand vertically, as represented in Fig. 3, with the fans B below it, the same being raised out of the liquid by the core C of the solenoid H, and hence lessening the resistance in proportion to the increase of the current. The spring $d$ serves to partially support the weight of the core and fans, and when there is no current through the solenoid the fans B are stopped against the projections $c$ at the bottom of the case M.

The rod C, forming the core of the solenoid, is suitably guided so that it may be rotated with the fan by the gear-wheels $e'f'$, the latter having a feather passing into a groove in the core-rod C.

The wheels $a\ b$, gearing and spring in the box A, the dials and hands D, and winding-stud $p$ are to be the same in both forms of apparatus.

I am aware that electric meters have been made in which the train of gearing and registering devices have been moved by an electric motor, and that the registration has been in proportion to the current. In my present invention the registering mechanism receives its initial motion by a mechanical appliance, and the electric action simply regulates the speed, and the mechanical rotation is stopped automatically when the electric current ceases.

I claim as my invention—

1. The combination, with a train of gearing and registering devices moved by a weight or spring, of a solenoid-magnet, through which the current to be measured passes, and a resistance to the revolution of the mechanism, the same being controlled by the solenoid-magnet, so that the greater the current the less the resistance to the revolution of the mechanism, substantially as set forth.

2. The combination, in an electric meter, of mechanism actuated by a weight or spring, indicating hands and dials, a solenoid-magnet through the helix of which the current passes, a fan revolved by the mechanism, and a solenoid-core and connection to such fan, whereby the resistance of said fan is varied in the reverse proportion to the electric current, substantially as set forth.

3. The combination, with a fan or similar resistance and mechanism, substantially as specified, for rotating the same, of a solenoid-magnet to move the fan and vary the resistance in proportion to the electric energy of the solenoid, and a stop that arrests the movement of the fan when the electric current ceases, substantially as set forth.

4. In an electric meter, the combination, with a fan or similar resistance and mechanism for rotating and registering the rotations, of a solenoid-magnet, the core of which is upon the shaft of the said fans, and mechanism actuated by such solenoid, substantially as specified, for moving the said fans and varying the resistance in the inverse proportion to the electric current, substantially as set forth.

Signed by me this 15th day of April, A. D. 1882.

S. D. MOTT.

Witnesses:
GEO. T. PINCKNEY,
WILLIAM G. MOTT.